US010670750B2

(12) United States Patent
Vdovina et al.

(10) Patent No.: US 10,670,750 B2
(45) Date of Patent: Jun. 2, 2020

(54) MULTISTAGE FULL WAVEFIELD INVERSION PROCESS THAT GENERATES A MULTIPLE FREE DATA SET

(71) Applicants: Tetyana Vdovina, Spring, TX (US); Reeshidev Bansal, Spring, TX (US); Anatoly Baumstein, Houston, TX (US); Yaxun Tang, Spring, TX (US); Di Yang, Spring, TX (US)

(72) Inventors: Tetyana Vdovina, Spring, TX (US); Reeshidev Bansal, Spring, TX (US); Anatoly Baumstein, Houston, TX (US); Yaxun Tang, Spring, TX (US); Di Yang, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 762 days.

(21) Appl. No.: 14/922,276

(22) Filed: Oct. 26, 2015

(65) Prior Publication Data

US 2016/0238722 A1 Aug. 18, 2016

Related U.S. Application Data

(60) Provisional application No. 62/117,227, filed on Feb. 17, 2015.

(51) Int. Cl.
*G01V 1/28* (2006.01)
*G01V 1/24* (2006.01)
(Continued)

(52) U.S. Cl.
CPC .............. *G01V 1/282* (2013.01); *G01V 1/368* (2013.01); *G01V 2210/56* (2013.01); *G01V 2210/66* (2013.01); *G01V 2210/67* (2013.01)

(58) Field of Classification Search
CPC ............ G01V 1/282; G01V 2210/614; G01V 2210/56; G01V 2210/67
See application file for complete search history.

(56) References Cited

U.S. PATENT DOCUMENTS 3,812,457 A 5/1974 Weller
3,864,667 A 2/1975 Bahjat
(Continued)

FOREIGN PATENT DOCUMENTS

CA 2 796 631 11/2011
EP 1 094 338 4/2001
(Continued)

OTHER PUBLICATIONS

U.S. Appl. No. 14/329,431, filed Jul. 11, 2014, Krohn et al.
(Continued)

*Primary Examiner* — Brian Turner
(74) *Attorney, Agent, or Firm* — ExxonMobil Upstream Research Company-Law Department

(57) ABSTRACT

A multi-stage FWI workflow uses multiple-contaminated FWI models to predict surface-related multiples. A method embodying the present technological advancement, can include: using data with free surface multiples as input into FWI; generating a subsurface model by performing FWI with the free-surface boundary condition imposed on top of the subsurface model; using inverted model from FWI to predict multiples; removing predicted multiples from the measured data; using the multiple-free data as input into FWI with absorbing boundary conditions imposed on top of the subsurface model; and preparing a multiple free data set for use in conventional seismic data processing.

14 Claims, 3 Drawing Sheets

(51) Int. Cl.
*G01V 1/30* (2006.01)
*G01V 1/38* (2006.01)
*G01V 1/36* (2006.01)

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 7,974,824 B2 | 7/2011 | Song |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 8,990,053 B2 | 3/2015 | Lazaratos et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |

(56) References Cited

U.S. PATENT DOCUMENTS

| | | |
|---|---|---|
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0103187 A1* | 5/2011 | Albertin ............... G01V 1/28 367/73 |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0253758 A1* | 10/2012 | Lazaratos ............... G01V 1/282 703/2 |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0301387 A1 | 11/2013 | van Groenestijn |
| 2013/0311149 A1 | 11/2013 | Tang |
| 2013/0311151 A1 | 11/2013 | Plessix |
| 2014/0136171 A1* | 5/2014 | Sword, Jr. ........... G06F 17/5009 703/10 |
| 2014/0350861 A1 | 11/2014 | Wang et al. |
| 2014/0358504 A1 | 12/2014 | Baumstein et al. |
| 2014/0372043 A1 | 12/2014 | Hu et al. |
| 2014/0379266 A1 | 12/2014 | Jiao et al. |
| 2015/0012221 A1 | 1/2015 | Bansal et al. |
| 2016/0061974 A1* | 3/2016 | Bansal ............... G01V 1/282 703/2 |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

U.S. Appl. No. 14/330,767, filed Jul. 14, 2014, Tang et al.

Nekut, A.G. et al., "Minimum energy adaptive subtraction in surface-related multiple attenuation," 1998 *SEG Expanded Absracts*, 4 pgs., (1998).

Neelamani, R. et al., "Adaptive Subtraction Using Complex Curvelet Transforms," 70th EAGE Conf. & Exh., Room, Italy, 5 pgs. (Jun. 9-12, 2008).

Zhang, D., et al., "Least-squares reverse time migration of multiples," *Geophysics* 79(1), pp. S11-S2, (Jan.-Feb. 2014).

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.

Barr, F.J. et al. (1989), "Attenuation of Water-Column Reverberations Using Pressure and Velocity Detectors in a Water-Bottom Cable," 59th Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

(56) References Cited

OTHER PUBLICATIONS

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transform," *J. Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," 73$^{rd}$ Eage Conference, *Abstract*, pp. F026.

Choi, Y et al. (2012), "Application of multi-source waveform inversion to marine stream data using the global correlation norm," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75$^{th}$ Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70$^{th}$ Annual Meeting Expanded Abstracts*, pp. 786-789.

Kennett, B.L.N. (1991), "The removal of free surface interactions from three-component seismograms", *Geophys. J. Int.* 104, pp. 153-163.

(56) References Cited

OTHER PUBLICATIONS

Kennett, B.L.N. et al. (1988), "Subspace methods for large inverse problems with multiple parameter classes," *Geophysical J.* 94, pp. 237-247.

Krebs, J.R. (2008), "Fast Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lancaster, S. et al. (2000), "Fast-track 'colored' inversion," $70^{th}$ SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," The Leading Edge, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," *Geophysics*, 74(2):doi:10.1190/1.3074303, pp. Q1-Q16.

Moghaddam, P.P. et al. (2010), "Randomized full-wavefield inversion: a dimenstionality-reduction approach," $80^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Mora, P. (1987), "Elastic Wavefield Inversion," PhD Thesis, Stanford University, pp. 22-25.

Mora, P. (1989), "Inversion=migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ Edition, pp. 165-176.

Nocedal, J. et al. (2000), "Numerical Optimization-Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E.et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 592-606.

(56) References Cited

OTHER PUBLICATIONS

Simard, P.Y. et al. (1990), "Vector Field Restoration by the Method of Convex Projections," *Computer Vision, Graphics and Image Processing* 52, pp. 360-385.

Sirgue, L. (2004), "Efficient waveform inversion and imaging: A strategy for selecting temporal frequencies," *Geophysics* 69, pp. 231-248.

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), "Reverse time migration with optimal checkpointing," *Geophysics* 72(5), pp. P.SM213-P.SM221.

Symes, W.W. (2009), "Interface error analysis for numerical wave propagation," *Compu. Geosci.* 13, pp. 363-371.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Amundsen, L., et al., (2014), "Wave Equation Processing Using Finite-Difference Progagators, Part 1: Wavefield Dissection and Imaging of Marine Multicomponent Seismic Data", Geophysics, vol. 79, No. 6, pp. T287-T300.

Neelamani, R., et al., (2010), "Adaptive Subtraction Using Complex-Valued Curvelet Transforms", Geophysics, vol. 75, No. 4, pp. V51-V60.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Tarantola, A. (1984), "Inversion of seismic reflection data in the acoustic approximation," *Geophysics* 49, pp. 1259-1266.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

Van Groenestijn, G.J.A. et al. (2009), "Estimating primaries by sparse inversion and application to near-offset reconstruction," *Geophyhsics* 74(3), pp. A23-A28.

Van Manen, D.J. (2005), "Making wave by time reversal," SEG International Exposition and 75$^{th}$ Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts*21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

\* cited by examiner

MULTISTAGE FULL WAVEFIELD INVERSION PROCESS THAT GENERATES A MULTIPLE FREE DATA SET

CROSS-REFERENCE TO RELATED APPLICATION

This application claims the benefit of U.S. Provisional Patent Application 62/117,227 filed Feb. 17, 2015, entitled MULTISTAGE FULL WAVEFIELD INVERSION PROCESS THAT GENERATES A MULTIPLE FREE DATA SET, the entirety of which is incorporated by reference herein.

FIELD OF THE INVENTION

Exemplary embodiments described herein pertain generally to the field of geophysical prospecting, and more particularly to geophysical data processing. More specifically, an exemplary embodiment can include inverting seismic data that contains multiple reflections and generating a multiple free data set for use with conventional seismic processing.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic inversion is a process of extracting information about the subsurface from data measured at the surface of the Earth during a seismic acquisition survey. In a typical seismic survey, seismic waves are generated by a source 101 positioned at a desired location. As the source generated waves propagate through the subsurface, some of the energy reflects from subsurface interfaces 105, 107, and 109 and travels back to the surface 111, where it is recorded by the receivers 103. The seismic waves 113 and 115 that have been reflected in the subsurface only once before reaching the recording devices are called primary reflections. In contrast, multiple reflections 117 and 119 are the seismic waves that have reflected multiple times along their travel path back to the surface (dashed lines in FIG. 1). Surface-related multiple reflections are the waves that have reflected multiple times and incorporate the surface of the Earth or the water surface in their travel path before being recorded.

As illustrated by FIG. 2, the generation of surface-related multiples requires that a free surface boundary condition be imposed. FIG. 2 illustrates interbed multiple 202 and free surface multiple 204. As discussed later in the detailed description section, the present technological advancement can remove free surface multiples from a data set. The dashed component 206 of the free surface multiple would not occur in the presence of an absorbing boundary condition.

Most seismic inversion methods rely on primary reflections only and treat all other seismic modes, including multiple reflections as "noise" that need to be suppressed during conventional seismic data processing prior to inversion. There are a number of multiple suppression methods available in industry. For example, suppression methods include surface-related multiple elimination (SRME), shallow water demultiple (SWD), model-based water-layer demultiple (MWD), and predictive deconvolution. Those of ordinary skill in the art are familiar with these suppression methods, and further discussion is not needed. However, all of the methods struggle with multiple elimination if the multiple and primary reflections overlap in the recorded seismic data. Furthermore, inadequate application of multiple suppression methods may result in damage to the primary data, rendering it unusable for inversion.

An alternative approach is to use inversion algorithms which accept the data that still contain surface-related multiples. Full Wavefield Inversion (FWI) is a seismic method capable of utilizing the full seismic record, including the seismic events that are treated as "noise" by standard inversion algorithms. The goal of FWI is to build a realistic subsurface model by minimizing the misfit between the recorded seismic data and synthetic (or modeled) data obtained via numerical simulation.

FWI is a computer-implemented geophysical method that is used to invert for subsurface properties such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model.

Numerical simulation can generate data with or without free surface multiples depending on the boundary condition imposed on top of the subsurface model. The free surface boundary condition yields data with surface-related multiples, while the transparent (absorbing) boundary condition allows for generation of multiple-free data. These two modes of numerical modeling lead to two standard approaches in FWI.

In one approach, FWI requires that the input seismic data have undergone some kind of multiple suppression procedure and uses absorbing boundary condition to model multiple-free synthetic data. In the other approach, the data still contain surface-related multiples which have to be modeled by imposing a free-surface boundary condition. The second approach is preferable, since it saves both time and resources required by application of conventional multiple suppression methods. Furthermore, it ensures that the integrity of the data is not compromised and has the potential of extracting additional information contained in multiple reflections. The drawback of the second approach is that it requires accurate modeling of surface-related multiples, which appear to be extremely sensitive to errors in the water-bottom reflectivity, source signature, location, etc. Even a small mismatch between the measured and simulated multiples may result in FWI models that are contaminated by the multiples of strong-contrast interfaces.

U.S. Pat. No. 7,974,824, the entire contents of which are hereby incorporated by reference, describes the seismic inversion of data containing surface-related multiples. Instead of pre-processing seismic data to remove surface-related multiples, a seismic waveform inversion process enables comparison of simulated seismic data containing surface-related multiples with observed seismic data also containing surface-related multiples. Based on this comparing, a model of a subterranean structure can be iteratively updated.

Zhang and Schuster (2013) describes a method where least squares migration (LSM) is used to image free-surface multiples where the recorded traces are used as the time histories of the virtual sources at the hydrophones and the surface-related multiples are the observed data. Zhang D. and Schuster G., "Least-squares reverse time migration of multiples," Geophysics, Vol. 79, S11-S21, 2013.

SUMMARY

A method, including: performing, with a computer, a first full wavefield inversion process on input seismic data that includes free surface multiples, wherein the first full wavefield inversion process is performed with a free-surface boundary condition imposed on a top surface of an initial subsurface physical property model, and the first full wavefield inversion process generates a final subsurface physical property model; predicting, with the computer, subsurface multiples with the final subsurface physical property model; removing, with the computer, the predicted subsurface multiples from the input seismic data; performing, with the computer, a second full wavefield inversion process on the input seismic data with the predicted subsurface multiples removed therefrom, wherein the second full wavefield inversion process is performed with an absorbing boundary condition imposed on a top surface of an initial subsurface physical property model, and the second full wavefield inversion process generates a multiple-free final subsurface physical property model; and using the multiple-free final subsurface physical property model as an input to an imaging or velocity model building algorithm, or in interpreting a subsurface region for hydrocarbon exploration or production.

In the method, the predicting can include using Born modeling.

In the method, the Born modeling can include using a background model and a reflectivity model.

The method can further include generating the reflectivity model by removing the background model from the intermediate inverted subsurface model by taking a derivative of the final subsurface physical property model in a vertical direction.

The method can include generating the reflectivity model by applying a filter operator to the final subsurface physical property model.

The method can include generating the reflectivity model using a migration algorithm.

In the method, the filter operator is a Butterworth filter in a wavenumber domain.

The method can further include removing direct arrivals from the input seismic data prior to the Born modeling.

In the method, the removing can include removing the subsurface multiples from the input seismic data with adaptive subtraction.

The method can further include causing subsurface multiple reflections generated by the Born modeling to be free of parasitic events.

In the method, the Born modeling can be performed with synthetic data generated from the final subsurface physical property model on regularly spaced grid nodes.

In the method, a length of an interval between the regularly spaced grid nodes can be equal to half a distance between seismic receivers in a cross-line direction.

Another method, including: performing, with a computer, a first full wavefield inversion process on input seismic data that includes free surface multiples, wherein the first full wavefield inversion process is performed with a free-surface boundary condition imposed on a top surface of an initial subsurface physical property model, and the first full wavefield inversion process generates a final subsurface physical property model; predicting, with the computer, subsurface multiples with the final subsurface physical property model; performing, with the computer, a second full wavefield inversion process on the input seismic data, wherein the second wavefield inversion process uses an objective function that only simulates primary reflections, the objective function being based on the predicted subsurface multiples, and the second full wavefield inversion process generates a multiple-free final subsurface physical property model; and using the multiple-free final subsurface physical property model as an input to an imaging or velocity model building algorithm, or in interpreting a subsurface region for hydrocarbon exploration or production.

Another method, including: performing, with a computer, a first full wavefield inversion process on input seismic data that includes free surface multiples, wherein the first full wavefield inversion process is performed with a free-surface boundary condition imposed on a top surface of an initial subsurface physical property model, and the first full wavefield inversion process generates a final subsurface physical property model; predicting, with the computer, subsurface multiples with the final subsurface physical property model; and removing, with the computer, the predicted subsurface multiples from the input seismic data and preparing multiple-free seismic data.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

An exemplary embodiment can include inverting seismic data that contains multiple reflections and generating a multiple free data set for use with conventional seismic processing. In one embodiment, a multi-stage FWI workflow uses multiple-contaminated FWI models to predict surface-related multiples with goals of: (1) removing them from the data before applying FWI or other inversion or imaging algorithms; and (2) generating a multiple free seismic data set for use in conventional seismic data processing. By way of example, a method embodying the present technological advancement, can include: using data with free surface multiples as input into FWI; generating a subsurface model by performing FWI with the free-surface boundary condition imposed on top of the subsurface model; using inverted model from FWI to predict multiples; removing predicted multiples from the measured data; using the multiple-free data as input into FWI with absorbing boundary conditions imposed on top of the subsurface model; and preparing a multiple free data set for use in conventional seismic data processing, such as conventional imaging or velocity model building algorithms. The present technological advancement transforms seismic data into a model of the subsurface.

Figure 1:
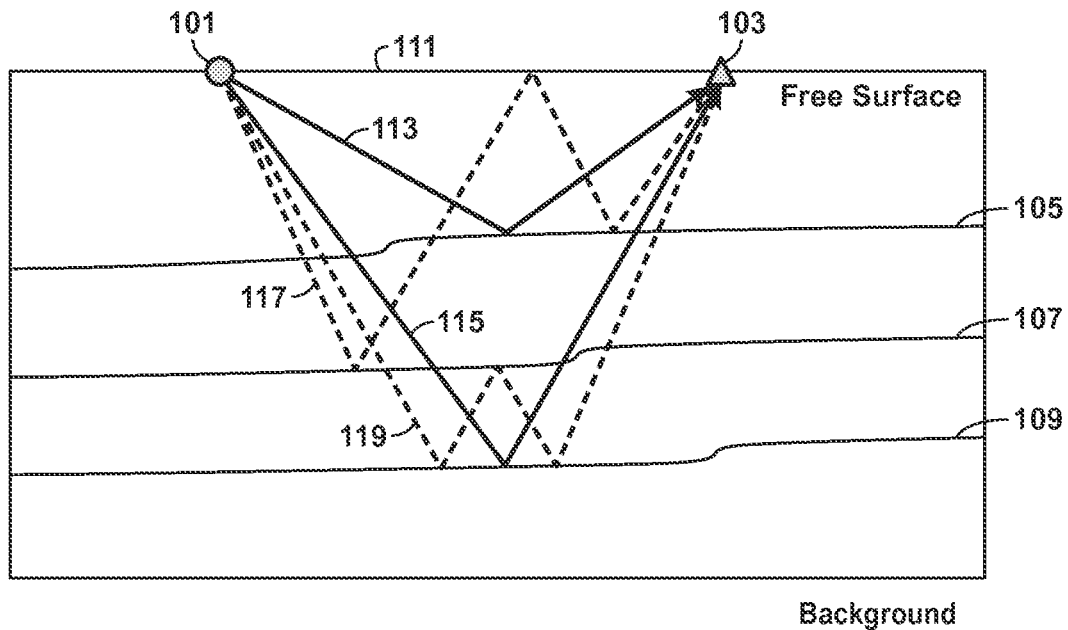
FIG. 1 is an example of primary reflections and multiple reflections.
Figure 2:
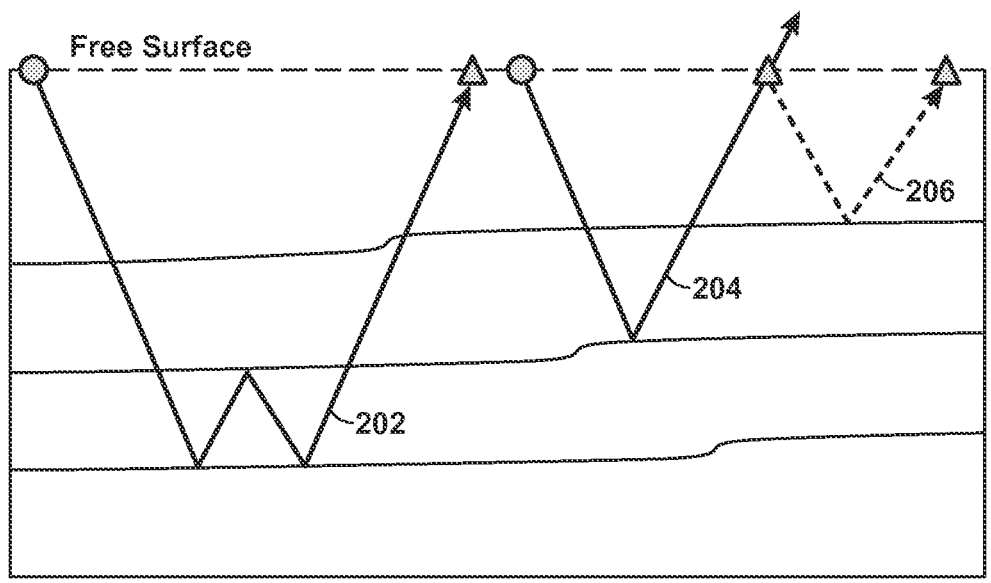
FIG. 2 is an example of an interbed surface related multiple and a free surface multiple.
Figure 3:
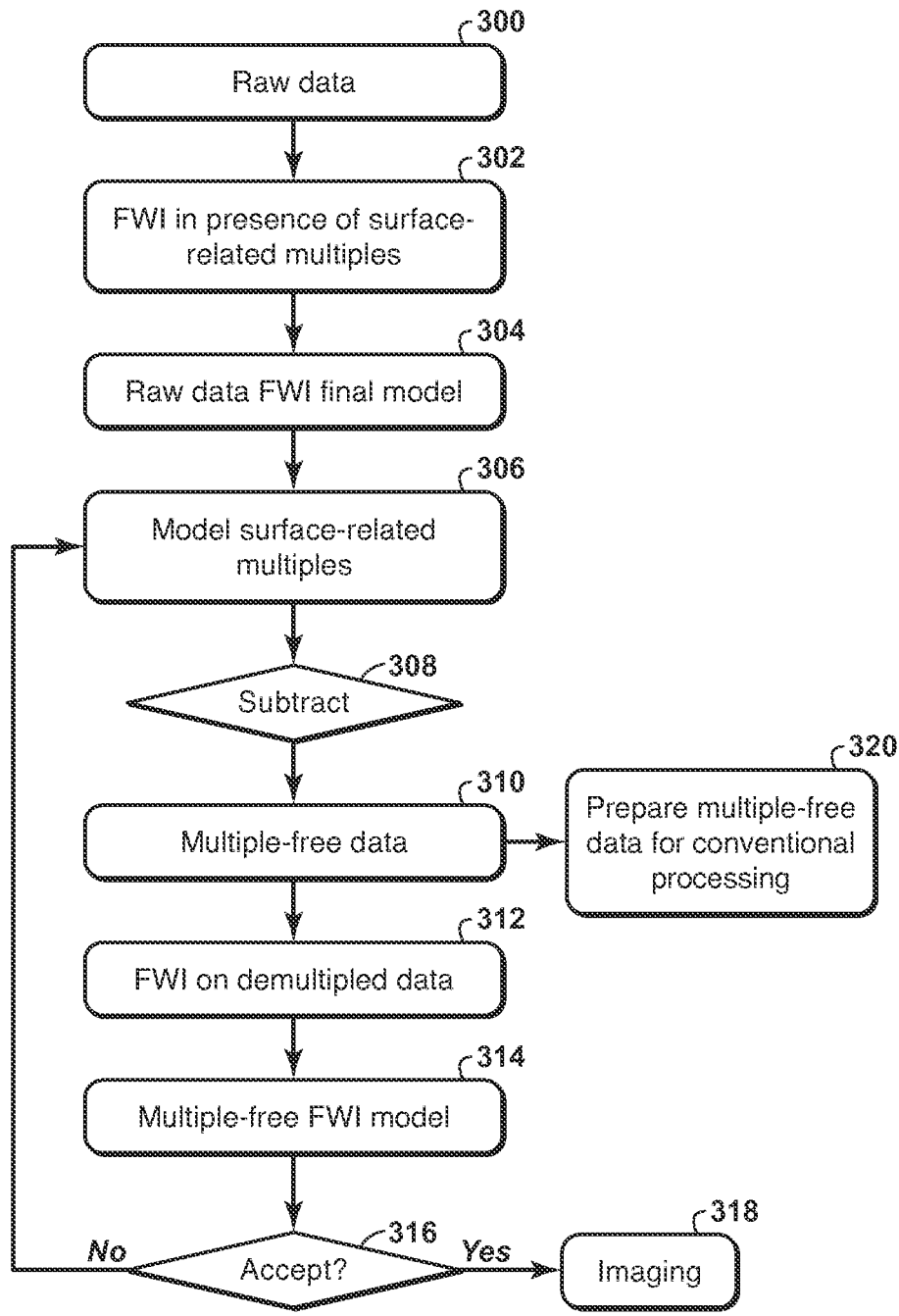
FIG. 3 is an exemplary flow chart illustrating an embodiment of the present technological advancement.

FIG. 3 is an exemplary flow chart illustrating an embodiment of the present technological advancement. In step 300, the data with free surface multiples is input into a computer that will apply an FWI workflow to the data with free surface multiples. The data with free surface multiples can be a full recorded data set. The data with free surface multiples can be obtained by using a source and receivers, as is well known in the art.

In step 302, FWI is performed on the data with free surface multiples in the presence of surface-related multiples. FWI is well-known to those of ordinary skill in the art. FWI can utilize an initial geophysical property model, with a free-surface boundary condition, and synthetic data can be generated from the initial geophysical property model. Generating and/or obtaining synthetic data based on an initial geophysical property model is well known to those of ordinary skill in the art. An objective function can be computed by using observed geophysical data and the corresponding synthetic data. A gradient of the cost function, with respect to the subsurface model parameter(s), can be used to update the initial model in order to generate an intermediate model. This iterative process should be repeated until the cost function reaches a predetermined threshold, at which point a final subsurface physical property model is obtained. Further details regarding FWI can be found in U.S. Patent Publication 2011/0194379, the entire contents of which are hereby incorporated by reference.

In step 304, an inverted FWI model (i.e., a subsurface physical property model) is generated through the performance of FWI by imposing a free-surface boundary condition on top of the initial subsurface model and subsequent revised models during the iterative FWI process. In some cases, the inverted FWI model might be contaminated by the multiples of the strong-contrast interfaces.

In step 306, the inverted FWI model is used to predict surface-related multiples. To predict surface-related multiples, an approach described in Zhang and Schuster (2013) can be used. Assuming that a subsurface model m can be separated into a slowly varying (background) component $m_0$ and a rapidly varying (reflectivity) component $\delta m$, the following equations can be used to predict multiple reflections for the measured data d ($\omega$, $x_g$, $x_s$) associated with the source at location $x_s$ and receivers at locations $x_g$:

$$[\nabla^2 + (\omega m_0(x))^2]P(x) = d(\omega, x_g, x_s), \quad (1)$$

$$[\nabla^2 + (\omega m_0(x))^2]M(x) = \omega^2 \frac{2\delta m(x)}{(m_o(x))^3} P(x), \quad (2)$$

where $\omega$ is an angular frequency. Equation (1) describes the propagation of the background wavefield P(x) through the background model $m_0$. Equation (2) computes the surface-related multiples M(x) generated when the background wavefield P(x) interacts with the reflectivity model $\delta m$ (see the right-hand side of Equation (2)). The theory underlying equations (1)-(2) assumes that seismic data d($\omega$, $x_g$, $x_s$) is recorded by receivers positioned on a dense and regularly spaced grid. Due to the acquisition limitations, both assumptions are violated in a typical seismic survey. Irregularities in the acquisition geometry cause artifacts in the predicted multiples. The artifacts manifest themselves as parasitic events that can be easily mistaken for the real multiple or primary reflections.

In the present embodiment, the measured data (seismic data d) on the right-hand side of equation (1) is replaced with synthetic data recorded on a regular and dense acquisition geometry. The present embodiment assumes a near-perfect match between the measured and synthetic data and requires a model of the subsurface that ensures such a match. Advantageously, the present embodiment takes advantage of a subsurface model built by applying FWI to the data with free surface multiples (step 304). Despite the fact that, in some cases, such a model might contain multiples from strong contrast interfaces and is not a correct representation of the subsurface, it is built by minimizing the mismatch (i.e., cost function) between the measured and synthetic data. Therefore, it can generate synthetic data which is a highly accurate approximation of the measured data.

There are two approaches to predicting surface related multiples. Both approaches require replacing measured data with synthetic data. FWI inverted model is utilized for this purpose. Despite the fact that, in some cases, such a model might contain multiples from strong contrast interfaces and is not a correct representation of the subsurface, it is built by minimizing the mismatch (i.e., cost function) between the measured and synthetic data. Therefore, it can generate synthetic data which is a highly accurate approximation of the measured data. The first approach is discussed above in regards to Zhang and Schuster (2013). The second approach includes the following steps:
1. generate synthetic data using FWI inverted model with free surface boundary conditions on top of the model;
2. generate synthetic data using FWI inverted model with absorbing boundary conditions on top of the model and mirror sources and receivers. Synthetic data generated with absorbing boundary conditions contains primary reflections only. Mirror sources and receivers ensure that reflections have source and receivers ghosts that match those of the data generated in Step 1. Using mirror sources and receivers for generating source and receiver ghosts is well known to those of the ordinary skill in the art and is discussed, for example, in the patent "Full-wavefield inversion using mirror source-receiver geometry"; and 3. subtract synthetic primaries generated in Step 2 from the data generated in Step 1 to obtain surface related multiples.

In step 308, predicted multiples are removed from the measured data. Surface-related multiples predicted by equations (1)-(2) can be removed from the measured data by adaptive subtraction methods. Adaptive subtraction is a method for matching and removing coherent noise, such as multiple reflections. Adaptive subtraction involves a matching filter to compensate for the amplitude, phase, and frequency distortions in the predicted noise model. Conventional adaptive subtraction techniques are known to those of ordinary skill in the art and they, for example, can be used to remove the predicted multiples in the present embodiment. Examples of adaptive subtraction can be found, for example, in Nekut, A. G. and D. J. Verschuur, 1998, Minimum energy adaptive subtraction in surface-related multiple attenuation: 68th Ann. Internat. Mtg., 1507.1510, Soc. of Expl. Geophys., the entire contents of which is incorporated by reference, and Neelamani, R., A. Baumstein, and W. S. Ross, 2008, Adaptive subtraction using complex curvelet transforms: 70th EAGE Conference and Exhibition, Rome, G048, the entire contents of which is incorporated by reference.

The resulting multiple-free data (step 310) can be used as an input into any inversion algorithm as well as conventional seismic data processing flows.

Step 312 includes performing a second full wavefield inversion process on the input seismic data with the predicted subsurface multiples removed therefrom, wherein the second full wavefield inversion process is performed with an absorbing boundary condition imposed on a top surface of an initial subsurface physical property model.

Step 314 includes generating, with the second full wavefield inversion process, a multiple-free final subsurface physical property model.

In step 316, if the acceptance criteria are satisfied, the process can move to step 318, which can include using the multiple-free final physical property subsurface model as an input to a migration algorithm or in interpreting a subsurface region for hydrocarbon exploration or production (e.g., drilling a well or imaging the subsurface). If the acceptance criteria are not satisfied, the process can return to step 306 for another iteration. The acceptance criteria can include having an interpreter examine the model and determine if it is acceptable. If the interpreter does not find the model acceptable, additional iterations can be executed. Of course, this interpretation by an interpreter can be computer assisted with well-known interpretation software.

In order to create a dense and regular receiver grid required by the multiple prediction algorithm implemented in step 306, a bounding box is defined based on the minimum and maximum values of the source and receiver locations in the original acquisition geometry. The receivers are positioned at regular intervals inside the bounding box. The length of the interval between the regular grid nodes can be equal to half the distance between the receivers in the cross-line direction. Finally, the geometry is padded with additional receivers to mitigate artifacts due to the truncation of receiver lines. The width of the padding is equal to the length of the taper function used to gradually force the recorded wavefield to zero. The original source locations are preserved, since the multiple prediction algorithm does not require sources on the regular grid. However, it is possible to generate additional data for such multiple suppression algorithms as EPSI, SRME, etc. A forward simulation is run using the final FWI model and record the wavefield at the new receiver locations.

Before inserting the recorded wavefields as source functions into Born modeling as part of step 306, a taper is applied to the traces recorded by the receivers located in the padding zone at the edges of the receiver lines. The purpose of this step is to ensure that the subsurface multiple reflections generated by Born modeling are free of the parasitic events (e.g., artifacts that can be easily mistaken for the real multiple or primary reflections). Any function smoothly varying between 1 and 0 can be used as a taper. One example of such a function is Hann window function:

$$\omega(n) = 0.5\left(1 + \cos\left(\frac{2\pi n}{N-1}\right)\right), \quad (3)$$

where N represent the length of the function in samples and n varies from 0 to N. Each sample of the taper function corresponds to the receiver in the padding zone. About 40 samples are sufficient to force the wavefield in the padding zone to zero.

The direct arrivals should be removed from the recorded wavefield prior to Born modeling. The direct arrivals correspond to the part of the wavefield that propagates through the water column from the source to the receivers. In deep water applications, the direct arrivals are well separated from the rest of the wavefield and are typically removed by muting. In shallow water, the direct arrivals are intermingled with other seismic events and cannot be muted without damage to the primary data. This embodiment can make use of the known water velocity to model the direct arrival and then subtract it from the data. After removing the direct arrivals, a taper is applied to the traces at the edges of the receiver lines to gradually force the wavefield to zero.

Born equations (1)-(2) utilize two subsurface models. The background model is smooth and contains only long wavelengths. It can be obtained from tomography, low frequency FWI, or by applying a smoothing operator to the final high-frequency FWI model. There are several ways to build the reflectivity model. One method includes removing the background component from the final FWI model by taking its derivative in the vertical direction. Alternatively, the background component can be removed by application of a filtering operator to the final FWI model. While both approaches produce a feasible reflectivity model, the second approach has the advantage of preserving the reflectivity spectrum of the original velocity model. A Butterworth filter (which is a type of signal processing filter designed to have as flat frequency response as possible in the passband) can be used in the wavenumber domain as the filtering operator, a non-limiting example of which is:

$$B(\omega)^2 = \frac{1}{1 + \left(\frac{\omega}{\omega_c}\right)^{2N}}, \quad (4)$$

where $\omega$ is a wavenumber at which calculation is made, $\omega_c$ is a cut-off wavenumber, and N is the length of the filter in samples.

The choice of the cutoff wavenumber depends on the velocity model and frequency of the measured data. For example, for a model that has velocities ranging from 1500 m/s to 5500 m/s and seismic data with the highest frequency of 40 Hz, the cutoff wavenumber is 0.005 m$^{-1}$.

The reflectivity model can also be generated using seismic migration. Migration algorithms relocate seismic events recorded at the surface of the Earth to the subsurface location where the events occurred. The image of the subsurface obtained after migration of the data that contains surface related multiples can be used as input into Born modeling. Kirchhoff migration is a well-known, cost-efficient and robust way to migrate the data, however, any migration algorithm can be used. Seismic Imaging: a review of the techniques, their principles, merits and limitations, Etienne Robein Houten, The Netherlands: EAGE Publications, 2010, the entire contents of which is hereby incorporated by reference, describes a number of migration algorithms that could be used to generate the reflectivity model.

The multiples generated by the Born equations are recorded on the original acquisition geometry. Adaptive subtraction is used to remove the multiples from the measured data.

In a second embodiment, instead of removing predicted multiples from the data, they are incorporated into FWI. An exemplary way to achieve this is to explicitly include multiples into the definition of the objective function. The conventional L2 objective function is defined as follows:

$$E(c) = \frac{1}{2}\|u - d\|^2, \quad (5)$$

where c is the model of the subsurface and d and u denote observed and simulated data, respectively. As mentioned above, inversion of data that contains surface related multiples can be challenging due to the mismatch between the measured and simulated multiples. However, if the surface related multiples are available prior to the numerical simulation, it is possible to design an operator M that accounts for the discrepancies between the simulated and measured multiples. In this case, the total simulated data u can be represented as a sum of primary reflections $u_0$ and surface related multiples $u_{srm}$. Then the objective function requires simulation of the primary reflections $u_0$ only:

$$E(c) = \frac{1}{2}\|u_0 + Mu_{srm} - d\|^2. \quad (6)$$

The operator M could be built from a Weiner filter. A Weiner filter minimizes the mean square error between the estimated and observed signals. In the present embodiment, the estimated signal is predicted multiples, and the observed signal is measured data. Such Weiner filters are well known and are described, for example, in Seismic Data Analysis: Processing, Inversion and Interpretation of Seismic Data, Oz Yilmaz, Stephen M. Doherty, Society of Exploration Geophysicists, 2000, the entire contents of which are hereby incorporated by reference.

Figure 4:
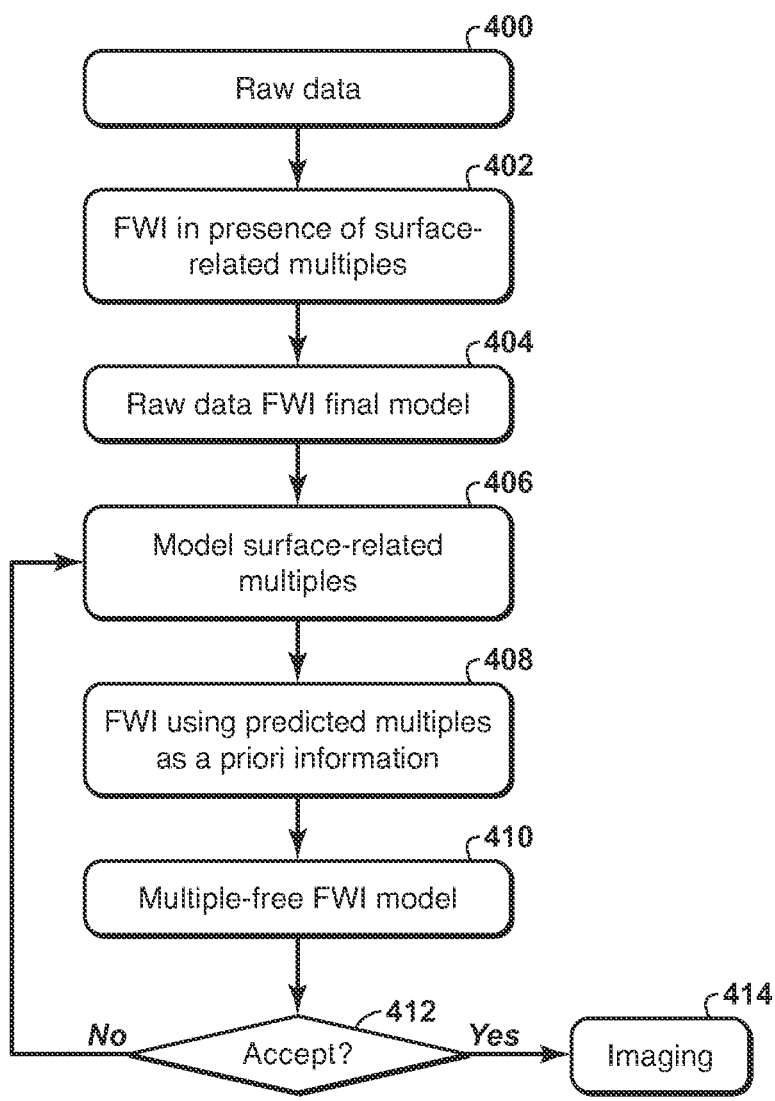
FIG. 4 is an exemplary flow chart illustrating an embodiment of the present technological advancement.

FIG. 4 illustrates an exemplary method embodying the present technological advancement, where the predicted multiples are incorporated into FWI. Steps 400, 402, 404, and 406 of FIG. 4 are analogous to steps 300, 302, 304, and 306 of FIG. 3, and do not need to be further discussed here.

A difference between the method of FIG. 3 and the method of FIG. 4 is that the subtracting step 308 is omitted from the method of FIG. 4, and instead the second FWI process uses the predicted multiples as a priori information.

Step 408 includes using multiple-free data from Step 406 as input into an FWI workflow that uses the modified objective function definition and absorbing boundary conditions imposed on top of the subsurface model.

Steps 410, 412, and 414 of FIG. 4 are analogous to steps 314, 316, and 318 of FIG. 3, and do not need to be further discussed here.

In all practical applications, the present technological advancement must be used in conjunction with a computer, programmed in accordance with the disclosures herein. Preferably, in order to efficiently perform FWI, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A method, comprising:
performing, with a computer, a first full wavefield inversion process on input seismic data that includes free surface multiples, wherein the first full wavefield inversion process is performed with a free-surface boundary condition imposed on a top surface of an initial subsurface physical property model, and the first full wavefield inversion process generates a final subsurface physical property model;
predicting, with the computer, subsurface multiples with the final subsurface physical property model;
wherein the method further includes,
(a) removing, with the computer, the predicted subsurface multiples from the input seismic data and preparing multiple-free seismic data, and performing, after the removing, a second full wavefield inversion process on the input seismic data with the predicted subsurface multiples removed therefrom, wherein the second full wavefield inversion process is performed with an absorbing boundary condition imposed on the top surface of an initial subsurface physical property model, and the second full wavefield inversion process generates a multiple-free final subsurface physical property model, or
(b) performing, with the computer, a second full wavefield inversion process on the input seismic data, wherein the second wavefield inversion process uses an objective function that only simulates primary reflections, the objective function being based on the predicted subsurface multiples, and the second full wavefield inversion process generates a multiple-free final subsurface physical property model;
using the multiple-free final subsurface physical property model as an input to an imaging or velocity model building algorithm, or in interpreting a subsurface region for hydrocarbon exploration or production; and forming and displaying, with the computer, a seismic image of the subsurface region, wherein the seismic image identifies a location of structure in earth's subsurface that returned seismic waves to receivers that recorded the input seismic data.

2. The method of claim 1, wherein the predicting includes using Born modeling.

3. The method of claim 2, wherein the Born modeling includes using a background model and a reflectivity model.

4. The method of claim 3, wherein the method includes generating the reflectivity model by removing the background model from the intermediate inverted subsurface model by taking a derivative of the final subsurface physical property model in a vertical direction.

5. The method of claim 3, wherein the method includes generating the reflectivity model by applying a filter operator to the final subsurface physical property model.

6. The method of claim 5, wherein the filter operator is a Butterworth filter in a wavenumber domain.

7. The method of claim 3, wherein the method includes generating the reflectivity model using a migration algorithm.

8. The method of any one of claims 2 to 6, wherein the method further includes removing direct arrivals from the input seismic data prior to the Born modeling.

9. The method of claim 2, wherein the method further comprises causing subsurface multiple reflections generated by the Born modeling to be free of parasitic events by applying a taper to traces included in the input seismic data.

10. The method of claim 2, wherein the Born modeling is performed with synthetic data generated from the final subsurface physical property model on regularly spaced grid nodes.

11. The method of claim 10, wherein a length of an interval between the regularly spaced grid nodes is equal to half a distance between seismic receivers in a cross-line direction.

12. The method of claim 1, wherein the method includes step (a) and the removing of the predicted subsurface multiples includes removing the predicted subsurface multiples from the input seismic data with adaptive subtraction.

13. The method of claim 1, wherein the predicting comprises:

generating first synthetic data using the final subsurface physical property model with free surface boundary conditions on top of the final subsurface physical property model;

generating second synthetic data, consisting of only primary reflections, using the final subsurface physical property model with absorbing boundary conditions on top of the final subsurface physical property model and mirror sources and receivers; and subtracting the primary reflections from the first synthetic data to obtain the subsurface multiples.

14. The method of claim 1, further comprising causing a well to be drilled based on the seismic image.

* * * * *